United States Patent
Yang et al.

(10) Patent No.: US 11,225,161 B2
(45) Date of Patent: Jan. 18, 2022

(54) START LOCKING SYSTEM FOR MOVABLE CHARGING VEHICLE

(71) Applicant: NIO (ANHUI) HOLDING CO., LTD., Hefei (CN)

(72) Inventors: Changcheng Yang, Shanghai (CN); Honggang Xu, Shanghai (CN)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 248 days.

(21) Appl. No.: 16/345,378

(22) PCT Filed: Jul. 28, 2017

(86) PCT No.: PCT/CN2017/095036
§ 371 (c)(1),
(2) Date: Apr. 26, 2019

(87) PCT Pub. No.: WO2018/076851
PCT Pub. Date: May 3, 2018

(65) Prior Publication Data
US 2019/0263283 A1 Aug. 29, 2019

(30) Foreign Application Priority Data

Oct. 27, 2016 (CN) .......................... 201610955040.0

(51) Int. Cl.
*B60L 53/60* (2019.01)
*H02J 7/00* (2006.01)

(52) U.S. Cl.
CPC ............ *B60L 53/60* (2019.02); *H02J 7/0029* (2013.01); *B60Y 2200/91* (2013.01); *B60Y 2300/91* (2013.01)

(58) Field of Classification Search
CPC .... B60L 53/60; H02J 7/0029; B60Y 2200/91; B60Y 2300/91
(Continued)

(56) References Cited

U.S. PATENT DOCUMENTS

| 9,963,039 | B1 * | 5/2018 | Jang ...................... E05B 43/005 |
| 2009/0057041 | A1 * | 3/2009 | Kamaga .................... B60L 3/00 180/65.245 |

(Continued)

FOREIGN PATENT DOCUMENTS

| CN | 102371997 | 3/2012 |
| CN | 103419728 | 12/2013 |

(Continued)

OTHER PUBLICATIONS

International Search Report prepared by the State Intellectual Property Office of the P.R. China dated Oct. 17, 2017, for International Application No. PCT/CN2017/095036.

*Primary Examiner* — Suresh Memula
(74) *Attorney, Agent, or Firm* — Sheridan Ross P.C.

(57) ABSTRACT

The invention relates to the field of movable charging vehicles, and specifically provides a start locking system for a movable charging vehicle. The invention aims to overcome the defect that the movable charging vehicle can still be started and moved during the being charging and charging of an onboard energy storage system. The start locking system of the invention comprises: a start loop, the movable charging vehicle being able to start when the start loop is switched on; and a first detection element for identifying whether an onboard energy storage system is able to enter an operating state, with the first detection element accessing the start loop, wherein the first detection element disconnects the start loop when the onboard energy storage system is able to enter an operating state. With the above structure, the start locking system of the invention can lock the start of the movable charging vehicle during the being charging and charging of the onboard energy storage system, thereby improving the safety performance of the movable charging vehicle.

20 Claims, 1 Drawing Sheet

(58) Field of Classification Search
USPC .......................................................... 320/109
See application file for complete search history.

(56) References Cited

U.S. PATENT DOCUMENTS

| | | | | |
|---|---|---|---|---|
| 2014/0016238 A1* | 1/2014 | Tazaki | ................. | H01H 47/002 |
| | | | | 361/88 |
| 2016/0001667 A1* | 1/2016 | Masuda | ................. | B60L 50/16 |
| | | | | 320/109 |
| 2020/0262305 A1* | 8/2020 | Chakraborty | ......... | B60L 53/665 |

FOREIGN PATENT DOCUMENTS

| | | |
|---|---|---|
| CN | 103863135 | 6/2014 |
| CN | 105121217 | 12/2015 |
| CN | 206237154 | 6/2017 |

\* cited by examiner

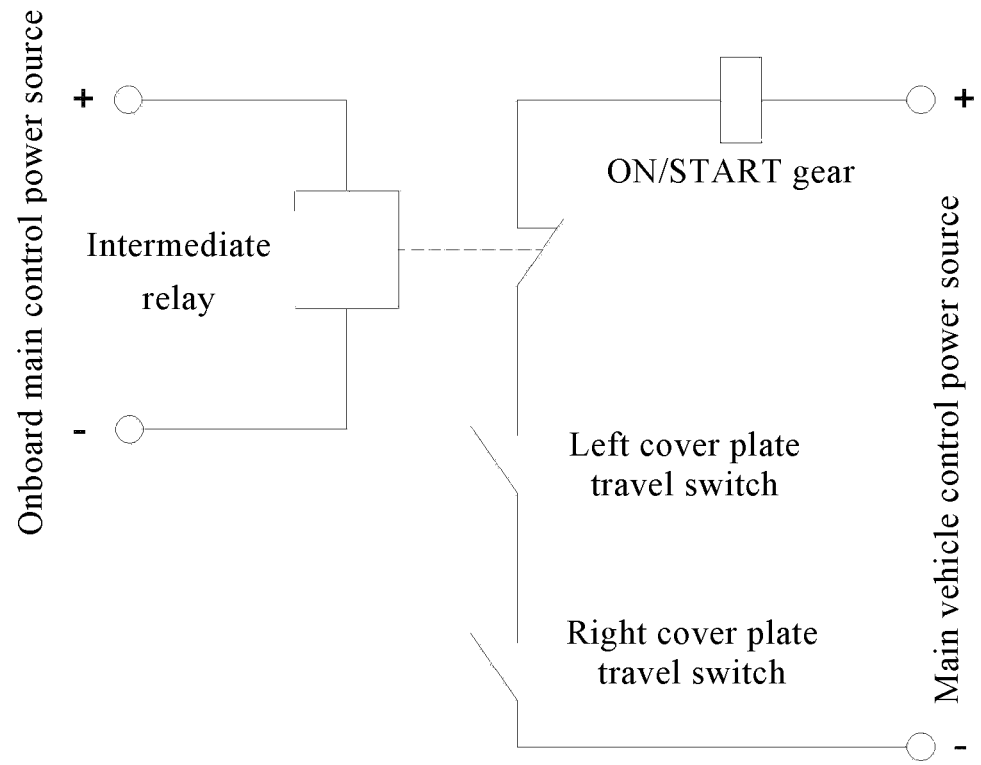

START LOCKING SYSTEM FOR MOVABLE CHARGING VEHICLE

CROSS REFERENCE TO RELATED APPLICATIONS

This application is a national stage application under 35 U.S.C. 371 and claims the benefit of PCT Application No. PCT/CN2017/095036 having an international filing date of 28 Jul. 2017, which designated the United States, which PCT application claimed the benefit of China Patent Application No. 201610955040.0 filed 27 Oct. 2016, the disclosure of each of which are incorporated herein by reference.

TECHNICAL FIELD

The invention relates to the field of movable charging vehicles, and particularly to a start locking system for a movable charging vehicle.

BACKGROUND ART

A movable charging vehicle is able to provide a reliable charging power source for various target objects through an onboard energy storage system. Compared with a relatively fixed charging station (including a plurality of charging piles), a movable charging vehicle is able to be more flexibly used, because of its movable characteristic, as a general-purpose storage battery charging device for refilling electric power to an electric vehicle that cannot continue driving due to the exhaustion of power, or serve as an emergency storage battery charging device in districts where charging stations have not been set up.

With the increase of resource and environment pressure, compared with fuel vehicles and hybrid vehicles, pure electric vehicles have gained considerable popularity in medium-sized and above cities due to their advantages of environmental protection and energy conservation. A power battery serving as a power source of a pure electric vehicle charges, during its life cycle, the pure electric vehicle by means of a charging pile of a charging station or the above-described movable charging vehicle so as to maintain the function of the power battery providing power for the pure electric vehicle.

The charging of a power battery of a pure electric vehicle by the movable charging vehicle is taken as an example below to illustrate the defects of the conventional movable charging vehicle. Specifically, since the charging time of the power battery is usually longer (for example, it takes about 0.5 h to charge 70~80% of power in a quick charging mode, whereas it takes 7~8 hs to fully charge the power battery in a slow charging mode), during this long charging time, the conventional movable charging vehicle has the characteristic of being started and moved even if the charging gun of the charging pile is connected. This characteristic mainly has the following two defects:

When the movable charging vehicle moves in any form during power supplement (being charging) at a charging station, a direct current charging gun of the charging pile may be pulled, which may, in turn, cause the falling-off and line breakage of the direct current charging gun, or even damage to the charging pile, etc. In addition, because the charging gun uses a high voltage, the movement of the movable charging vehicle during power supplement is very dangerous.

When the movable charging vehicle moves in any form during power supplement (being charging) or external power supplying (charging) at a charging station, since each in-vehicle device of the charging vehicle is in a charged state, the vibration or bump accompanying the movement of the charging vehicle may cause vibration damage to the device, which may further cause accidents due to the short circuit of the in-vehicle device.

SUMMARY OF THE INVENTION

Technical Problem

In view of this, the technical problem to be solved by the invention is how to avoid the start or movement of a movable charging vehicle during the being charging and charging of an onboard energy storage system.

Solution

In order to solve the above technical problem, according to one embodiment of the invention, a start locking system for a movable charging vehicle is provided. The start locking system comprises:

a start loop, the movable charging vehicle being able to start when the start loop is switched on; and a first detection element for identifying whether an onboard energy storage system is able to enter an operating state, with the first detection element accessing the start loop, wherein the first detection element disconnects the start loop when the onboard energy storage system is able to enter an operating state.

According to the start locking system for a movable charging vehicle, in one possible implementation, the first detection element comprises a plurality of detection members, and at least one of the plurality of detection members accesses, in series, the start loop.

According to the start locking system for a movable charging vehicle, in one possible implementation, the detection member is a travel switch arranged in the onboard energy storage system, and normally-open contacts of a plurality of the travel switches access, in series, the start loop.

According to the start locking system for a movable charging vehicle, in one possible implementation, the onboard energy storage system is provided with an input socket and/or an output socket, the input socket and/or the output socket are/is provided with a cover plate, the change in position of the cover plate relative to the onboard energy storage system enables the input socket and/or the output socket to be exposed to the environment, and the onboard energy storage system is able to enter the operating state if the input socket and/or the output socket are/is exposed to the environment; and the travel switch is positioned on the onboard energy storage system such that it can detect the changes in position of the cover plate relative to the onboard energy storage system.

According to the start locking system for a movable charging vehicle, in a possible implementation, the input socket and/or the output socket are/is arranged on a side plate of at least one side of the onboard energy storage system.

According to the start locking system for a movable charging vehicle, in a possible implementation, a plurality of input sockets and/or a plurality of output sockets are respectively arranged on a first side of the onboard energy storage system and a second side opposite to the first side, and each of the input sockets and/or the output sockets is provided with a cover plate.

According to the start locking system for a movable charging vehicle, in one possible implementation, the start locking system further comprises a second detection element for identifying whether the onboard energy storage system enters an operating state, and disconnecting the start loop if the onboard energy storage system enters an operating state.

According to the start locking system for a movable charging vehicle, in one possible implementation, the second detection element is a relay, the relay being arranged in an onboard main control power source of the onboard energy storage system, and a normally-closed contact of the relay accessing the start loop.

According to the start locking system for a movable charging vehicle, in one possible implementation, the normally-closed contact and the first detection element access, in series, the start loop.

Beneficial Effects

In the start locking system for a movable charging vehicle of the invention, the first detection element determines whether the onboard energy storage system is able to enter an operating state (being charging and/or charging), and disconnects the start loop enabling the movable charging vehicle to start and move in the case where the onboard energy storage system is able to enter an operating state, regardless of whether it has actually entered the operating state, so as to lock the start of the movable charging vehicle when the onboard energy storage system has the possibility of being charging/charging, thereby avoiding possible start and movement of the movable charging vehicle during the being charging and charging of the onboard energy storage system, and effectively improving the safety of the movable charging vehicle.

Other features and aspects of the invention will become apparent from the following detailed description of exemplary embodiments with reference to the accompanying drawings.

BRIEF DESCRIPTION OF THE DRAWINGS

The accompanying drawings, which are incorporated in and constitute a part of the description, illustrate the exemplary embodiments, features and aspects of the invention together with the description, and are used for explaining the principle of the invention.

FIG. 1 shows a schematic structural diagram of a start locking system for a movable charging vehicle of one embodiment of the invention.

DETAILED DESCRIPTION OF EMBODIMENTS

Various exemplary embodiments, features and aspects of the invention will be described in detail below with reference to the accompanying drawings. The same reference numerals in the drawings denote elements with the same or similar functions. Although various aspects of the embodiments are shown in the drawings, the drawings are not necessarily drawn to scale unless otherwise indicated.

The word "exemplary" used herein means "serving as an example, an embodiment, or being illustrative". Any embodiment described herein as being "exemplary" is not necessarily to be construed as being superior to or better than other embodiments. Furthermore, the terms "first" and "second" are used for descriptive purposes only, and cannot be understood as indicating or implying relative importance.

In addition, numerous specific details are given in the following Detailed Description in order to better describe the invention. It should be appreciated by a person skilled in the art that the invention may be implemented without some specific details. In some instances, methods, means, elements and circuits well known to a person skilled in the art are not described in detail in order to highlight the gist of the invention.

The movable charging vehicle is a movable charging device carrying an onboard energy storage system. The onboard energy storage system in a start state has two states of being charging and charging, and can be supplied with power by an external power supply (such as a charging pile at a charging station) in the being charging state, so as to reserve its own charging capability. For example, the onboard energy storage system can be charging during an idle time by making full use of a peak-to-valley period of power consumption, such that the onboard energy storage system can obtain as high "service" capability as possible. In the charging state, the onboard energy storage system can supply power to a target power device. For example, in the case where a charging pile cannot be established, a charging pile is not available currently, or a power grid is being repaired and reformed and a charging device is faulty, the onboard energy storage system, as a distributed energy storage power source or emergency power source, provides emergency charging for a target power device such as a power battery of a pure electric vehicle. By moving the movable charging vehicle, the onboard energy storage system can provide timely power for the target power device more flexibly and conveniently. Still taking the pure electric vehicle as an example, by supplying power to a power battery with power almost exhausted, the pure electric vehicle corresponding to the power battery can at least travel to a destination where a charging pile can be obtained.

Embodiment 1

Considering the safety hazard of the characteristic "being started and moved during the being charging and charging of the onboard energy storage system" of the conventional movable charging vehicle, the invention controls a main vehicle control power source at a start gear of the movable charging vehicle, so that the onboard energy storage system locks the start of the movable charging vehicle during being charging and charging, that is, the movable charging vehicle can be started and moved only when the being charging/charging behaviors of the onboard energy storage system are not performed. By locking the start of the movable charging vehicle during the being charging/charging of the onboard energy storage system, on one hand, a charging gun is prevented from being pulled to further cause falling-off of, line breakage of, damage etc. to the direct current charging gun, and on the other hand, the phenomena of a vibration damage to in-vehicle devices caused by the vibration or bump generated when the movable charging vehicle is moved, of a short circuit of the in-vehicle devices which is further caused by the vibration damage, etc. are also avoided, thereby effectively improving the use safety of the movable charging vehicle, and prolonging the service lives of the movable charging vehicle and the devices therein. Referring to FIG. 1, the start locking system mainly includes:

a start loop, the movable charging vehicle being able to start and move when the start loop is switched on; and a first detection element accessing the start loop and mainly used for identifying whether an onboard energy storage system is able to enter an operating state. Specifically, the first detection element disconnects the start loop when the onboard energy storage system is able to enter an operating state. In the case of disconnection of the start loop, the start of the movable charging vehicle is locked, and certainly, the movement thereof after the start does not occur (the movement here is mainly interpreted as movement in a normal travelling manner, that is, a behavior after the start). Further, the first detection element may include a plurality of detection members, and at least one of the plurality of detection members accesses, in series, the start loop.

The operating state of the onboard energy storage system mainly includes a being charging and/or charging process of the onboard energy storage system. The onboard energy storage system being able to enter an operating state can be understood as the onboard energy storage system having a tendency to enter an operating state. That is to say, the first detection element can at least conclude, from the detected parameter and/or phenomenon, that the onboard energy storage system may enter an operating state of being charging and/or charging at or after the occurrence of the parameter and/or phenomenon. For example, the first detection element can detect the above parameter and/or phenomenon based on a wired or wireless connection mode, as long as it can be ensured that the parameter and/or phenomenon can be reliably detected at the occurrence thereof, and it can be determinately obtained, according to the detected parameter and/or phenomenon, that the onboard energy storage system has a tendency to enter a being charging and/or charging state.

For example, the onboard energy storage system is generally provided with several input sockets for a charging pile to supplement power to the onboard energy storage system and output sockets for the onboard energy storage system to supply power to a power battery. The being charging/charging functions of the onboard energy storage system can be realized by connecting a cable to a corresponding socket. For example, one end of the cable is inserted into the input socket in a matching manner, and a charging gun at the other end thereof is inserted into the charging pile, so as to realize power supply to (being charging of) the onboard energy storage system. Similarly, one end of the cable is inserted into the output socket in a matching manner, and the charging gun at the other end of the cable is inserted into a charging port of the pure electric vehicle, so as to realize power supply to (charging of) the power battery from the onboard energy storage system. Then, as long as the input and/or output sockets are detected to have a tendency to be exposed to the environment, it can be concluded that the onboard energy storage system has a tendency to enter a being charging/charging state. Certainly, it could be understood by a person skilled in the art that the above input sockets may also be omitted, such that the power supply to the vehicle-mounted energy storage system can be realized by means of battery swapping.

Generally, a cover plate is added on the input socket/output socket, which is mainly used for covering, without a being charging/charging behavior, the input/output socket to ensure the safety thereof. By changing the position of the cover plate relative to the onboard energy storage system, the input socket and/or the output socket corresponding to the cover plate are/is exposed to the environment. The position of the cover plate relative to the onboard energy storage system can be changed in the following ways: completely removing (e.g. disassembling or unscrewing) the cover plate from the onboard energy storage system, or moving, in an overturnable manner, the cover plate relative to the onboard energy storage system if it is still ensured that the cover plate is connected to the onboard energy storage system, etc. Certainly, depending on the actual situations, other reasonable modes capable of realizing a position change can also be selected for the connection between the cover plate and the onboard energy storage system.

In the case where the input socket and/or the output socket are/is exposed to the environment, the being charging and/or charging process of the onboard energy storage system can be implemented by a corresponding cable. Then, it can be detected, by the first detection element, whether the cover plate has a change in position (such as displacement), so as to determine whether the onboard energy storage system has a tendency to enter a being charging/charging state, that is, at least having the possibility of entering a being charging/charging state. According to actual needs, in order to meet the adaptability and functional integrity of the onboard energy storage system, any number of input sockets and/or output sockets can be arranged at any side of the onboard energy storage system, and each of the input sockets and/or the output sockets can be provided with a cover plate, or a few sockets share one cover plate.

In one possible implementation, a travel switch can be installed, at a position where the change in position of the cover plate relative to the onboard energy storage system can be detected, on the onboard energy storage system, and a normally-open contact of the travel switch accesses (in series) the start loop, specifically accessing the start loop of a main vehicle control power source (i.e., the original start power source of the movable charging vehicle) mainly used for completing the start of the movable charging vehicle as shown in FIG. 1. The movable charging vehicle can be started when the start loop is switched on. In this way, as long as the cover plate is displaced such that the input/output socket may be exposed to the environment (e.g., the cover plate is opened), the travel switch disconnects the start loop of the main vehicle control power source, and the movable charging vehicle cannot be started, and certainly cannot enter the operating state of being charging and/or charging.

Preferably, as shown in FIG. 1, a set of socket groups consisting of an input socket and an output socket may be respectively arranged at the left and right sides of the onboard energy storage system (viewed from the front of the onboard energy storage system), and a left cover plate and a right cover plate are respectively configured for the socket groups at the left and right sides; and a travel switch can be installed near the position, on the onboard energy storage system, where each cover plate is installed, i.e., adding a left cover plate travel switch and a right cover plate travel switch corresponding to the left cover plate and the right cover plate, and it is ensured that normally-open contacts of individual travel switches are arranged in series in the start loop. In this way, as long as the cover plate at either side is opened, the start loop of the main vehicle control power source is disconnected, and the movable charging vehicle cannot be started.

That is to say, through the travel switches connected in series to the loop of the main vehicle control power source, the start locking system of the invention can draw, according to an action of opening the cover plate, a conclusion that the onboard energy storage system is at least about to be in a being charging or charging state, and locks the start of the movable charging vehicle first when the onboard energy storage system has the possibility of entering the being charging/charging state. In fact, even if the cover plate is opened, the onboard energy storage system does not necessarily enter the operating state, but performs other operations such as wiping or overhauling. However, in order to ensure the reliability of the movable charging vehicle, the start of the movable charging vehicle is locked when the onboard energy storage system has the possibility of entering the operating state.

In addition, the start locking system of the invention may further include a second detection element, which is different from the first detection element and is mainly used for identifying whether the onboard energy storage system enters an operating state, for example, whether the onboard energy storage system enters a start state. In the case where the onboard energy storage system enters an operating state, the second detection element disconnects the start loop to lock the start of the movable charging vehicle.

In one possible implementation, the second detection element may be a relay (such as an intermediate relay). Referring specifically to FIG. 1, an intermediate relay may be added to the loop of the main vehicle control power source (i.e., a start power source installed on the movable charging vehicle) mainly used for completing the start of the onboard energy storage system, and a normally-closed contact of the intermediate relay is also connected in series to the loop of the main vehicle control power source. In this way, as long as the onboard energy storage system is started, the main vehicle control power source is definitely charged, and the main vehicle control power source is switched from being not charged to being charged, so that the normally-closed contact of the intermediate relay is disconnected, and the loop of the main vehicle control power source is also disconnected. That is to say, the movable charging vehicle cannot be started at the start of the onboard energy storage system and in the operating state after the start.

That is to say, the arrangement of the intermediate relay enables the start locking system of the invention to draw, according to the charged start of the onboard energy storage system, a conclusion that the onboard energy storage system is to be in an operating state, and then the start of the movable charging vehicle is first locked when the onboard energy storage system is started.

Further, the second detection element and the first detection element may be arranged in series in the start loop, and as long as either of the first detection element and the second detection element satisfies a locking condition, the start of the movable charging vehicle can be locked to further improve the reliability of start locking. That is, the normally-closed contact of the intermediate relay and the normally-open contact of each travel switch are arranged in series in the loop of the main vehicle control power source. In this way, under the co-action of the travel switch of the cover plate and the intermediate relay of the onboard energy storage battery, when the cover plate of any input/output socket is displaced and/or the onboard energy storage system is started (or in an operating state after start), the main vehicle control power source is disconnected in time, that is, locking the start of the main vehicle control power source, such that the movable charging vehicle cannot be started, thereby avoiding the start and movement of the movable charging vehicle during the being charging/charging of the onboard energy storage system. When the onboard energy storage system stops operating, the main vehicle control power source can be switched on and the movable charging vehicle can be started in the case where an onboard main control power source is disconnected, and the cover plate of each input/output socket is closed. By increasing the start locking of the movable charging vehicle, the safety of the movable charging vehicle during the being charging and charging of the onboard energy storage battery is actively and effectively improved.

It should be noted that the start locking system for a movable charging vehicle is introduced above by taking the case that the ON and OFF of the intermediate relay are controlled by the start and stop of the onboard main control power source of the onboard energy storage system, and the ON/OFF of a travel switch group is controlled by the opening/closing of the cover plate of the input/output socket as an example, but it could be understood by a person skilled in the art that the invention is not limited thereto. In fact, a user can flexibly set a locking time, a locking structure, a locking mode, etc. for the movable charging vehicle according to actual situations, e.g., according to other identification parameters for determining that the onboard energy storage system can enter an operating state and enters the operating state, actual application scenarios, etc.

Heretofore, the technical solutions of the invention have been described in conjunction with the preferred embodiments shown in the accompanying drawings; however, it could be easily understood by a person skilled in the art that the protection scope of the invention is obviously not limited to these specific embodiments. Equivalent modifications or substitutions could be made to related technical features by a person skilled in the art without departing from the principle of the invention, and the technical solutions after these modifications or substitutions shall fall within the protection scope of the invention.

What is claimed is:

1. A start locking system for a movable charging vehicle, the start locking system comprising:
    a start loop, the movable charging vehicle being able to start when the start loop is switched on; and
    a first detection element for identifying whether an onboard energy storage system is able to enter an operating state, with the first detection element accessing the start loop,
    wherein the first detection element disconnects the start loop when the onboard energy storage system is able to enter an operating state.

2. The start locking system for a movable charging vehicle according to claim 1, wherein the first detection element comprises a plurality of detection members, and at least one of the plurality of detection members accesses, in series, the start loop.

3. The start locking system for a movable charging vehicle according to claim 2, wherein the detection member is a travel switch arranged in the onboard energy storage system, and normally-open contacts of a plurality of the travel switches access, in series, the start loop.

4. The start locking system for a movable charging vehicle according to claim 3, wherein the onboard energy storage system is provided with an input socket and/or an output socket, the input socket and/or the output socket are/is provided with a cover plate, the change in position of the cover plate relative to the onboard energy storage system enables the input socket and/or the output socket to be exposed to the environment, and the onboard energy storage system is able to enter the operating state if the input socket and/or the output socket are/is exposed to the environment; and
    wherein the travel switch is positioned on the onboard energy storage system such that it can detect the change in position of the cover plate relative to the onboard energy storage system.

5. The start locking system for a movable charging vehicle according to claim 4, wherein the input socket and/or the output socket are/is arranged on a side plate of at least one side of the onboard energy storage system.

6. The start locking system for a movable charging vehicle according to claim 5, wherein a plurality of the input sockets and/or the output sockets are respectively arranged on a first side of the onboard energy storage system and a second side opposite to the first side, and each of the input sockets and/or the output sockets is provided with a cover plate.

7. The start locking system for a movable charging vehicle according to claim 1, wherein the start locking system further comprises a second detection element for identifying whether the onboard energy storage system enters an operating state, and disconnecting the start loop if the onboard energy storage system enters an operating state.

8. The start locking system for a movable charging vehicle according to claim 7, wherein the second detection element is a relay, the relay being arranged in an onboard main control power source of the onboard energy storage system, and a normally-closed contact of the relay accessing the start loop.

9. The start locking system for a movable charging vehicle according to claim 8, wherein the normally-closed contact and the first detection element access, in series, the start loop.

10. The start locking system for a movable charging vehicle according to claim 2, wherein the start locking system further comprises a second detection element for identifying whether the onboard energy storage system enters an operating state, and disconnecting the start loop if the onboard energy storage system enters an operating state.

11. The start locking system for a movable charging vehicle according to claim 3, wherein the start locking system further comprises a second detection element for identifying whether the onboard energy storage system enters an operating state, and disconnecting the start loop if the onboard energy storage system enters an operating state.

12. The start locking system for a movable charging vehicle according to claim 4, wherein the start locking system further comprises a second detection element for identifying whether the onboard energy storage system enters an operating state, and disconnecting the start loop if the onboard energy storage system enters an operating state.

13. The start locking system for a movable charging vehicle according to claim 5, wherein the start locking system further comprises a second detection element for identifying whether the onboard energy storage system enters an operating state, and disconnecting the start loop if the onboard energy storage system enters an operating state.

14. The start locking system for a movable charging vehicle according to claim 6, wherein the start locking system further comprises a second detection element for identifying whether the onboard energy storage system enters an operating state, and disconnecting the start loop if the onboard energy storage system enters an operating state.

15. The start locking system for a movable charging vehicle according to claim 10, wherein the second detection element is a relay, the relay being arranged in an onboard main control power source of the onboard energy storage system, and a normally-closed contact of the relay accessing the start loop.

16. The start locking system for a movable charging vehicle according to claim 11, wherein the second detection element is a relay, the relay being arranged in an onboard main control power source of the onboard energy storage system, and a normally-closed contact of the relay accessing the start loop.

17. The start locking system for a movable charging vehicle according to claim 12, wherein the second detection element is a relay, the relay being arranged in an onboard main control power source of the onboard energy storage system, and a normally-closed contact of the relay accessing the start loop.

18. The start locking system for a movable charging vehicle according to claim 13, wherein the second detection element is a relay, the relay being arranged in an onboard main control power source of the onboard energy storage system, and a normally-closed contact of the relay accessing the start loop.

19. The start locking system for a movable charging vehicle according to claim 14, wherein the second detection element is a relay, the relay being arranged in an onboard main control power source of the onboard energy storage system, and a normally-closed contact of the relay accessing the start loop.

20. The start locking system for a movable charging vehicle according to claim 15, wherein the normally-closed contact and the first detection element access, in series, the start loop.

* * * * *